(12) United States Patent
Jenner-Braunschmied et al.

(10) Patent No.: US 10,916,757 B2
(45) Date of Patent: Feb. 9, 2021

(54) BATTERY, BATTERY MODULE FOR THE BATTERY, AND BUS BAR THEREFOR

(71) Applicant: Nordfels GmbH, Bad Leonfelden (AT)

(72) Inventors: Edmund Jenner-Braunschmied, Zwettl an der Rodl (AT); Martin Reingruber, Vorderweißenbach (AT)

(73) Assignee: VOLTLABOR GmbH, Bad Leonfelden (AT)

( * ) Notice: Subject to any disclaimer, the term of this patent is extended or adjusted under 35 U.S.C. 154(b) by 79 days.

(21) Appl. No.: 16/323,907

(22) PCT Filed: Aug. 8, 2017

(86) PCT No.: PCT/EP2017/070125
§ 371 (c)(1),
(2) Date: Feb. 7, 2019

(87) PCT Pub. No.: WO2018/029224
PCT Pub. Date: Feb. 15, 2018

(65) Prior Publication Data
US 2019/0165351 A1    May 30, 2019

(30) Foreign Application Priority Data
Aug. 8, 2016 (EP) .................... 16183280

(51) Int. Cl.
*H01M 2/20* (2006.01)
*H01H 85/08* (2006.01)
*H01M 2/34* (2006.01)

(52) U.S. Cl.
CPC ............ *H01M 2/202* (2013.01); *H01H 85/08* (2013.01); *H01M 2/34* (2013.01); *H01M 2200/103* (2013.01)

(58) Field of Classification Search
CPC ......... H01M 2/202; H01M 2/266; H01M 2/34
See application file for complete search history.

(56) References Cited

U.S. PATENT DOCUMENTS 5,474,475 A * 12/1995 Yamaguchi ........ H01H 85/2035
439/620.27
2010/0291426 A1 11/2010 Zhou
2013/0202941 A1* 8/2013 Ono .................... H01M 10/425
429/121

FOREIGN PATENT DOCUMENTS

DE 102011007319 A1 10/2012
EP 2339669 A1 6/2011
EP 2608243 A1 6/2013

* cited by examiner

Primary Examiner — Olatunji A Godo

(57) ABSTRACT

A battery, a battery module for the battery, and a bus bar therefor for connecting battery cells are disclosed, said bus bar having an electrically conductive metal sheet and at least one sheet metal connector, which is produced in the metal sheet by means of a cutting method and has a contact section that is offset out from the sheet plane for electrically connecting to a pole of the battery cell, at least one electrical fuse, and a suspension section, which is provided between the metal sheet and the contact section, with the suspension section being divided into at least two electrically parallel leg sections. In order to achieve a durable and structurally simple bus bar with a fuse, it is proposed that the fuse be composed of the two electrically parallel leg sections.

12 Claims, 5 Drawing Sheets

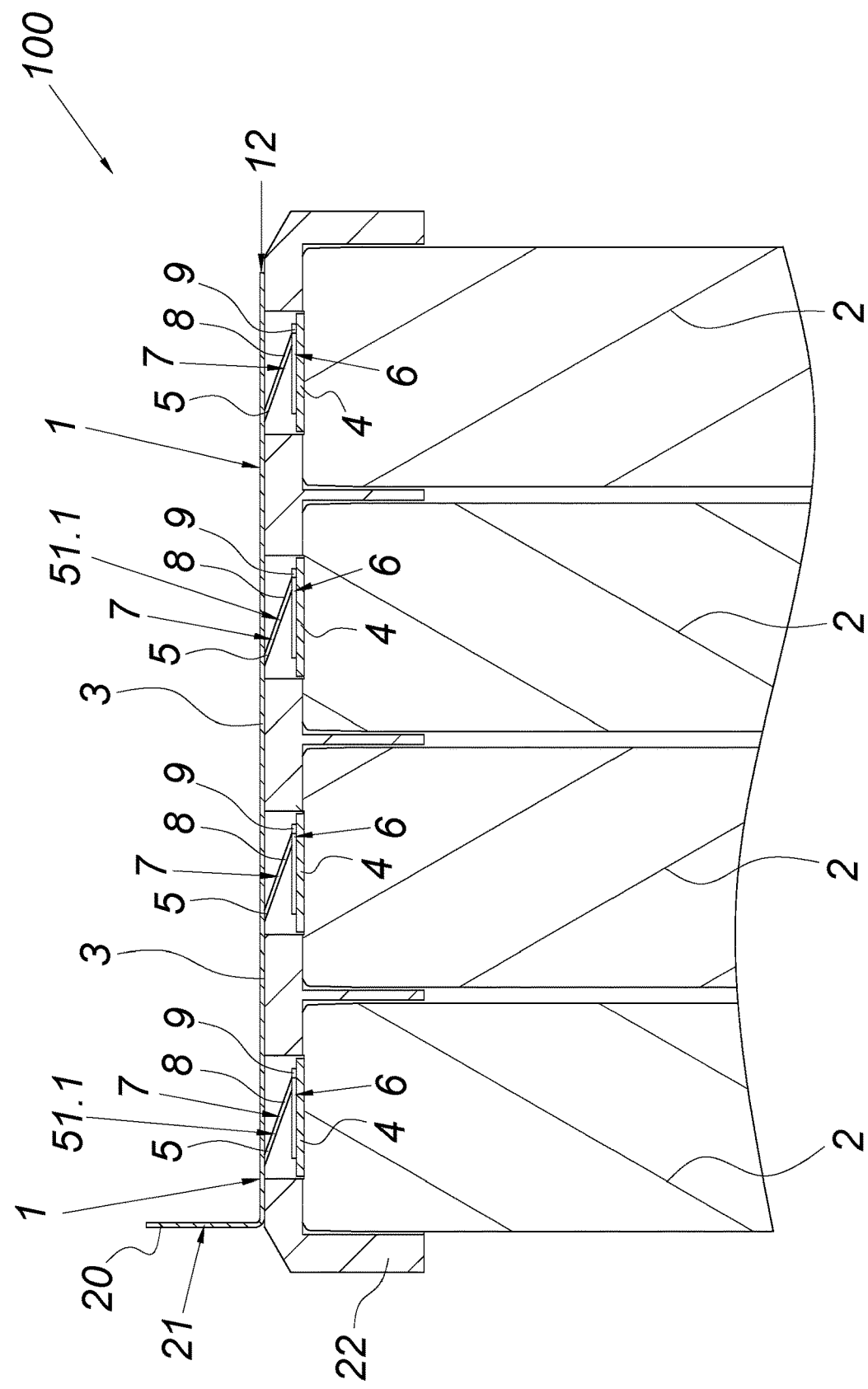

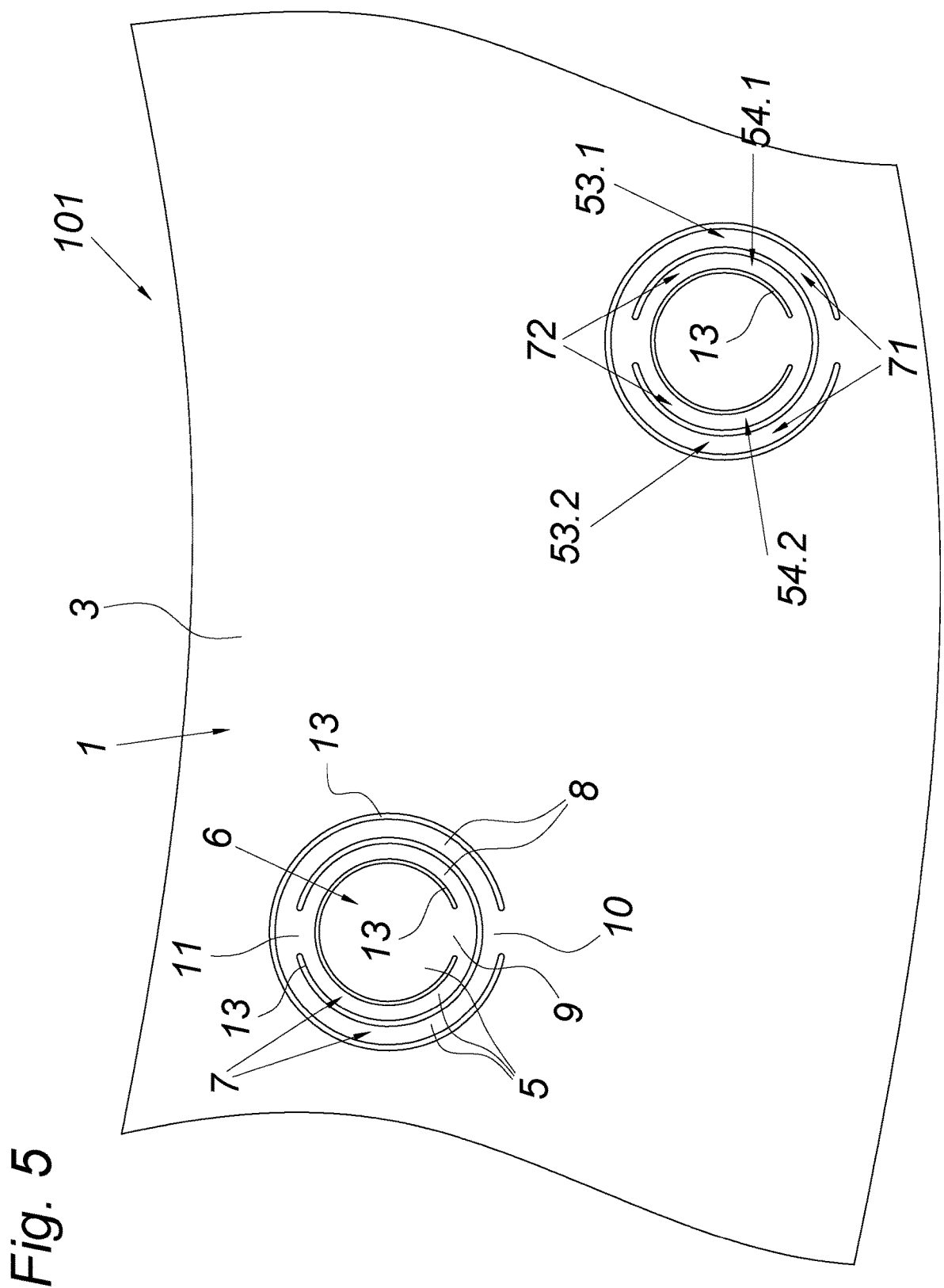

BATTERY, BATTERY MODULE FOR THE BATTERY, AND BUS BAR THEREFOR

FIELD OF THE INVENTION

The invention relates to a battery, a battery module for the battery, and a bus bar therefor for connecting battery cells, having an electrically conductive metal sheet and at least one sheet metal connector which is produced in the metal sheet by means of a cutting method and has a contact section that is offset out from the sheet plane for electrically connecting to a pole of the battery cell, at least one electrical fuse, and a suspension section, which is provided between the metal sheet and the contact section, with the suspension section being divided into at least two electrically parallel leg sections.

BACKGROUND OF THE INVENTION

Bus bars for parallel or serial electrical interconnection of battery cells are known from the prior art. Bus bars of this kind use an electrically conductive metal sheet and sheet metal connectors that protrude from it and are electrically connected to the battery cells. To this end, the sheet metal connectors have a contact section, which is welded to a pole of a battery cell. The sheet metal connectors are produced in the metal sheet, for example incised into it, by means of a cutting method—which can be carried out by means of stamping or laser cutting.

With sheet metal connectors, it is also known (EP2608243A1), to provide them with a fuse section, which forms an electrical fuse on the sheet metal connector and protects the battery cell that is connected to it from a safety-critical amperage. The fuse in this case is embodied in the form of a special fuse wire, which is embedded in an electrically insulating resin. This fuse wire disadvantageously reduces the mechanical stability of the bus bar and is also relatively complex in design.

SUMMARY OF THE INVENTION

The object of the invention, based on the prior art described at the beginning, is thus to create a bus bar that has a fuse and is embodied in both a durable and simply designed way.

The Invention Attains the Stated Object in that the Fuse is Embodied by the Two Electrically Parallel Leg Sections.

If the fuse is embodied by the two electrically parallel leg sections, then a fuse can be provided on a bus bar in a particularly simply designed way. It is thus possible to do without a constriction resistor, which negatively affects stability and longevity, and to eliminate the need or providing a special fuse wire. In addition, the fuse that is formed by the two leg sections can result in an increased multi-dimensional mobility of the sheet metal connector—which allows the device according to the invention to absorb impacts and vibrations in a particularly easy, safe way. This can reduce the risk of mechanical line breaks and extend the service life of the bus bar in comparison to the prior art. Furthermore, this shape of the fuse section can be produced in a comparatively simply designed way—for example by forming it directly out of the sheet metal of which the metal sheet is composed, for example by means of a stamping procedure or by means of an incision (shearing/laser cutting). The bus bar according to the invention and the sheet metal connector can therefore be embodied of a single piece, thus among other things making it possible to provide an inexpensively produced bus bar. This therefore eliminates the need for other measures for embodying the fuse section or other aids for increasing the mechanical strength.

In general, it should be noted that the metal sheet can contain a nickel material to facilitate manufacture. A nickel material can also feature an improved weldability to a pole of the battery cell.

The embodiment of the fuse can be further simplified in design if the inner edges of the two leg sections extend in mirror symmetrical fashion relative to each other. In particular, this permits a homogeneous distribution of the flowing currents, which makes it possible to insure a uniform melting of the fuse.

If the two leg sections are positioned diametrically opposite from each other, then the invention can feature a particularly simple production, which makes it possible to achieve a less expensive bus bar.

A particularly durable bus bar can also be achieved if the two leg sections particularly extend in the shape of a circular arc or elliptical curve. In this case, it is possible to avoid tight bending radii in the fuse—and to thus produce a bus bar that is even more durable overall.

Alternatively, the leg sections can extend in the shape of a rectangle. Outstanding elastic properties of the suspension section can be produced in this case, making it possible to achieve a particularly high durability of the bus bar.

If the two kg sections are connected to the metal sheet and the contact section at diametrically opposed connecting pieces, then the suspension section can resiliently compensate for axial movements between the battery cells and the metal sheet. In particular, it is thus possible to eliminate vibrations or impacts in a durable way. The suspension section is therefore connected to the metal sheet at one of its ends and at its other end, is connected to the contact section, thus producing an electrical connection between the contact section and the metal sheet. This makes it possible to achieve a particularly durable and simply designed bus bar.

The resilient action of the suspension section can be further increased if it has a plurality of electrically serial line segments composed of electrically parallel leg sections. In particular, the serial line segments can in turn be connected to one another via diametrically opposing connecting pieces, which produces a spring that can be extended in the axial direction. The suspension section can therefore withstand powerful axial stresses (such as impacts, bending movements, thermal expansions, etc.)—which makes it possible to achieve a particularly durable bus bar.

The reliability of the bus bar can be further increased if the leg sections form a flat spring. Especially if the leg sections form a planar flat spring, it is possible to achieve a particularly compact bus bar, which is well-suited for use in tight spaces, for example. The flat spring can in turn be prestressed somewhat by being axially extended—and can thus exhibit an improved spring behavior. The axial extension can for example take place at the same time as the electrical contacting or bonding of the contact section to the pole of the battery cell.

If the leg sections are embodied as sheet metal strips, then the bus bar can be produced in a simple way. The sheet metal strips of the leg sections in this case can be cut directly from the metal sheet. In addition, the sheet metal strips can provide a conductor path width that is sufficient for carrying powerful currents. In this way, it is also possible on the one hand to achieve a high mechanical stability while on the other hand enabling creation of a particularly fast-reacting fuse in a simply designed way.

The fuse can be a short circuit fuse in order to thus limit the consequences of both an internal short circuiting and an external short circuiting of the battery cell that is connected to the bus bar. An internal short circuiting of the battery cell can, for example, occur due to a mechanical overloading of the battery cell. The passage of a short circuit current through the damaged battery cell is durably prevented by the bus bar according to the invention, making it possible to protect other battery cells—which are electrically connected in parallel by means of the bus bar—from failure. The short circuit fuse according to the invention also protects an intact battery cell from being damaged by another battery cell that is electrically connected to it in parallel by means of the bus bar. It is therefore possible to achieve a bus bar that is able to durably protect battery cells from internal and external short circuits in the bus bar. This can be particularly advantageous in a battery module in which multiple battery cells are electrically connected to a bus bar in parallel.

Furthermore, by contrast with the prior art, the embodiment of the fuse as a short circuit fuse makes it possible to minimize the electrical resistance between the bus bar and battery cell, which not only keeps the total resistance in the main current path advantageously low, but also can provide for a good voltage balancing between the parallel battery cells during charging and discharging.

The bus bar according to the invention can be particularly well-suited for a battery module with multiple battery cells in which the sheet metal connectors of the bus bar are each connected to a respective pole of a battery cell.

In general, it should be noted that a particularly durable contacting between the bus bar and the pole of the battery cell can be achieved if the contact section of the sheet metal connector is bonded to the pole of the battery cell. For example, this bonding can be achieved by means of a welding process, in particular spot welding or laser welding.

A plurality of battery modules according to the invention can be advantageously connected to one another electrically to produce a battery.

BRIEF DESCRIPTION OF THE DRAWINGS

The subject of the invention is shown in greater detail in the figures based on an embodiment variant serving as an example. In the drawings:

FIG. 1 shows a cross-sectional view of a battery module,
FIG. 5 shows a top view of the bus bar of the battery module from FIG. 4.

DETAILED DESCRIPTION OF THE PREFERRED EMBODIMENTS

Figure 2B:
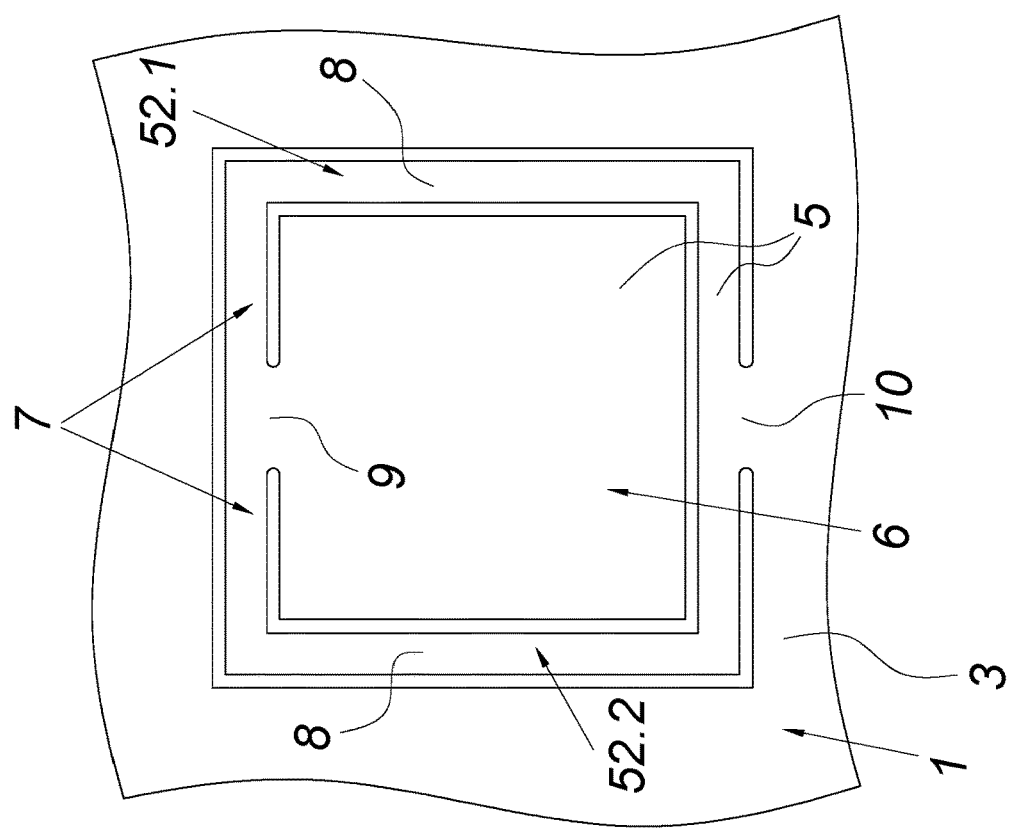
FIGS. 2a & 2b show detail views of different bus bars according to the invention.

As an example, FIG. 1 shows a bus bar 1 according to the invention for connecting battery cells 2. The bus bar 1 in this case is embodied as a metal sheet 3, namely a nickel sheet, in order to produce an electrically conductive connection between the poles 4 of the battery cells 2. For this purpose, the metal sheet 3 has a sheet metal connector 5, which is produced from the metal sheet 3 for this by means of a cutting process (for example stamping, incision (shearing), or laser cutting), and is then stretched in the axial direction or normal direction relative to the sheet plane 12. This axial stretching can for example take place at the same time as the electrical contacting or bonding of the sheet metal connector 5 to a pole 4 of a battery cell 2.

As a result, the sheet metal connector 5 has a contact section 6 that is offset out from the sheet plane 12 of the metal sheet 3 for producing the electrical connection between the bus bar 1 and the respective pole 4 of the battery cell 2.

Between the metal sheet 3 and the contact section 6, the sheet metal connector 5 also has a suspension section 7 that consists of two or more leg sections 51.1 and 51.2 or 52.1 and 52.2, respectively, that are electrically connected to one another in parallel and extend laterally relative to the contact section 6.

According to the invention, these leg sections 51.1 and 51.2 or 52.1 and 52.2, respectively, combine to form a fuse 8 in order to disconnect the battery cell 2 from the bus bar 1 in the event of a malfunction. In other words, the leg sections 51.1, 51.2, 52.1, 52.2 constitute the sole electrical connection between the pole 4 of the battery cell 2 and the bus bar 1, which is electrically disconnected in the event of a malfunction.

A short circuit occurring in the event of a malfunction of the battery cell 2 can thus be durably prevented by the fuse 8—which makes it possible not only to protect the rest of the battery cells 2, but also prevents a possible short circuiting and overheating of electrically parallel battery cells 2.

The leg sections 51.1, 52.1 are preferably embodied as sheet metal strips 11, which are cut out from the metal sheet 3, for example by means of stamping—as a result of which these transition integrally into the contact section 6 and bus bar 1. In particular, this sheet metal strip 11 has a constant width over its entire length in order to be able to embody the fuse 8 in a reproducible way. Such an embodiment can therefore dispense with the addition of structural components and fuse wires and achieve a bus bar 1 that is particularly simple in design and thus inexpensive. In addition, the bus bar 1 according to the invention can resiliently eliminate mechanical stresses, in particular vibrations in the axial direction of the battery cells 2, since a constriction resistor of the kind that is used in fuses of the prior art, can be omitted. This achieves a particularly durable bus bar 1.

Figure 2A:
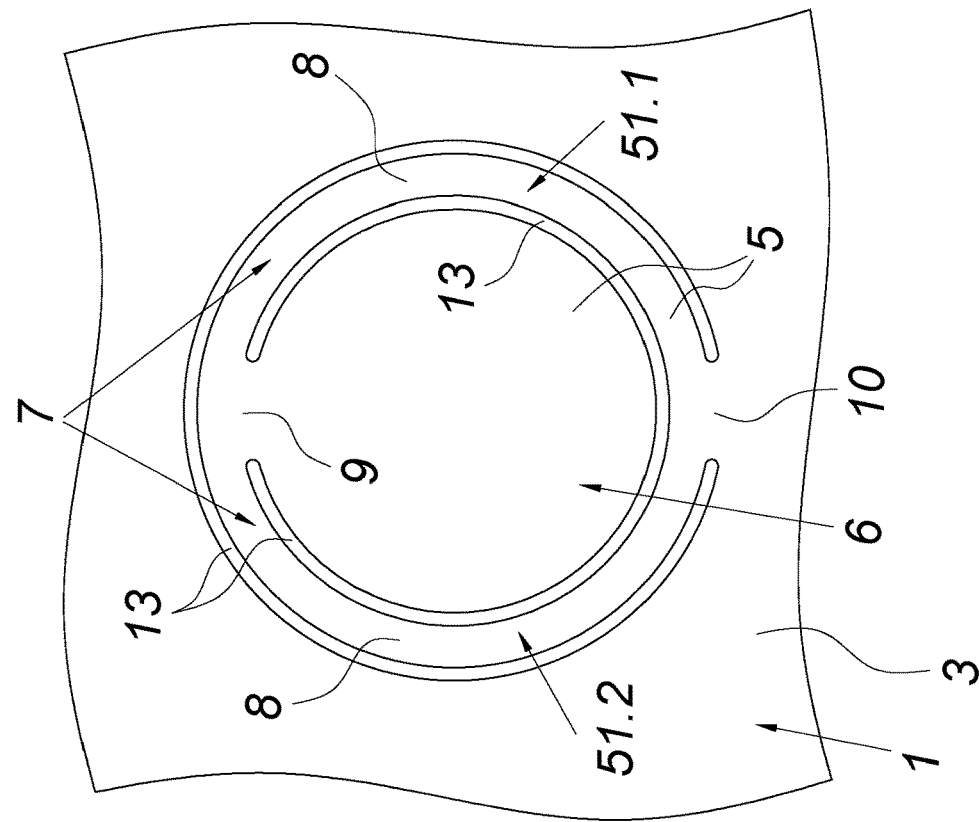

As is also apparent in FIGS. 2a and 2b, the inner edges of the two leg sections 51.1, 51.2, 52.1, 52.2 extend in mirror symmetrical fashion relative to each other around the contact section 6. It is thus possible to achieve a homogeneous current flow through the leg sections 51.1, 51.2, 52.1, 52.2, thus avoiding the need for a current divider in the fuse 8, which would result in an overloading of a leg section 51.1, 51.2, 52.1, 52.2. In addition, the leg sections 51.1, 51.2 and 52.1, 52.2 are positioned diametrically opposite each other and are embodied as circular (or elliptical) leg sections 51.1, 51.2 or as rectangular leg sections 52.1, 52.2.

FIG. 5 shows another embodiment in which the suspension section 7 has multiple line sections 71, 72 that are connected to one another in series and are each composed of respective parallel-connected leg sections 53.1, 53.2 (in line section 71) and 54.1, 54.2 (in line section 72). This suspension section 7, which is advantageously composed of multiple line sections 71, 72, can advantageous enable a greater mobility of the entire sheet metal connector 5 and thus also durably absorb movements of the battery cells 2 in directions other than their axial direction. A multi-dimensional mobility of the suspension section 7 can therefore be achieved, thus enabling achievement of a particularly durable bus bar 1.

The leg sections 51.1 and 51.2; 52.1 and 52.2; and 53.1 and 53.2 are each connected to the contact section 6 via a respective connecting piece 9. The leg sections 51.1 and 51.2; 52.1 and 52.2; and 54.1 and 54.2 are connected to the metal sheet 3 of the bus bar 1 via a connecting piece 10. The leg sections 53.1 and 53.2 are likewise connected to the leg sections 54.1 and 54.2 via a connecting piece 11. These connecting pieces 9, 10, 11 simultaneously function as resilient links, making it possible to achieve a resilient effect of the suspension section 7. In particular, the leg sections 51.1, 51.2, 52.1, 52.2, 53.1, 53.2, 54.1, 54.2 in connection with the connecting pieces 9, 10, 11 form a flat spring, which can be deflected in the axial direction of the battery cells 2.

The leg sections 51.1, 51.2, 52.1, 52.2, 53.1, 53.2, 54.1, 54.2 are preferably embodied as sheet metal strips that are cut out from the metal sheet 3, for example by means of stamping, as a result of which they transition integrally into the contact section 6 and the bus bar 1. In particular, this sheet metal strip has a constant width over its entire length in order to enable the fuse 8 to be embodied in a reproducible way.

The suspension section 7 is embodied as an electric fuse 8, namely as a short circuit fuse 8, which is triggered by an overcurrent to or from the battery cell 2 and thus disconnects the affected battery cell 2 from the bus bar 1 in the event of a malfunction.

FIG. 1 shows a cross-sectional view of a battery module 100 in which multiple battery cells 2 are electrically connected to a bus bar 1 according to the invention. The electrical connection in this case is produced between the pole 4 of a battery cell 2 and the contact section 6 of the sheet metal connector 5 respectively associated with the battery cell 2. The battery cells 2 in this case are positioned next to one another in the battery module 100 and have a unidirectional orientation, i.e. are electrically connected in parallel. The battery cells 2 can also be held in position by a battery frame 22.

The contact sections 6 of the respective sheet metal connectors 5 are bonded to the associated pole 4 of the battery cell 2 in order to insure a low contact resistance and a durable connection. In particular, this bonding is produced by means of one or more spot welds—among other things because they are inexpensive to produce.

Figure 4:
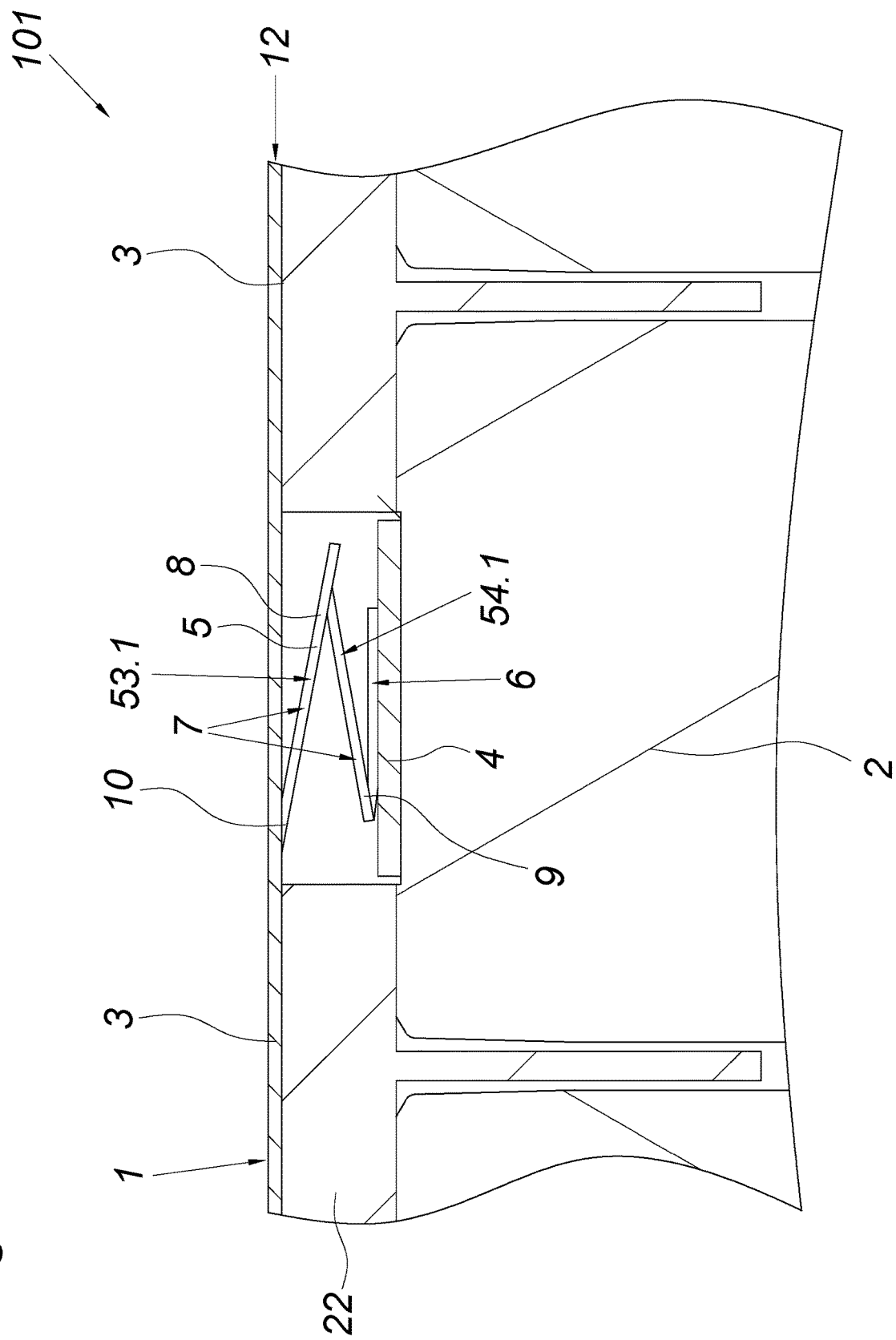
FIG. 4 shows a cross-sectional view of another embodiment type of the battery module according to the invention.

FIG. 4 shows a battery module 101 with a bus bar 1 having suspension sections 7 that each have two series-connected line sections 71, 72. FIG. 5 shows a top view of this battery module 101.

Multiple battery modules 100, 101 according to the invention can thus be interconnected to form a battery. In this case, the desired voltage and capacity or power of the battery can be adjusted by connecting the battery modules 100, 101 in parallel or in series. This has not been shown in detail in the figures, however.

Figure 3:
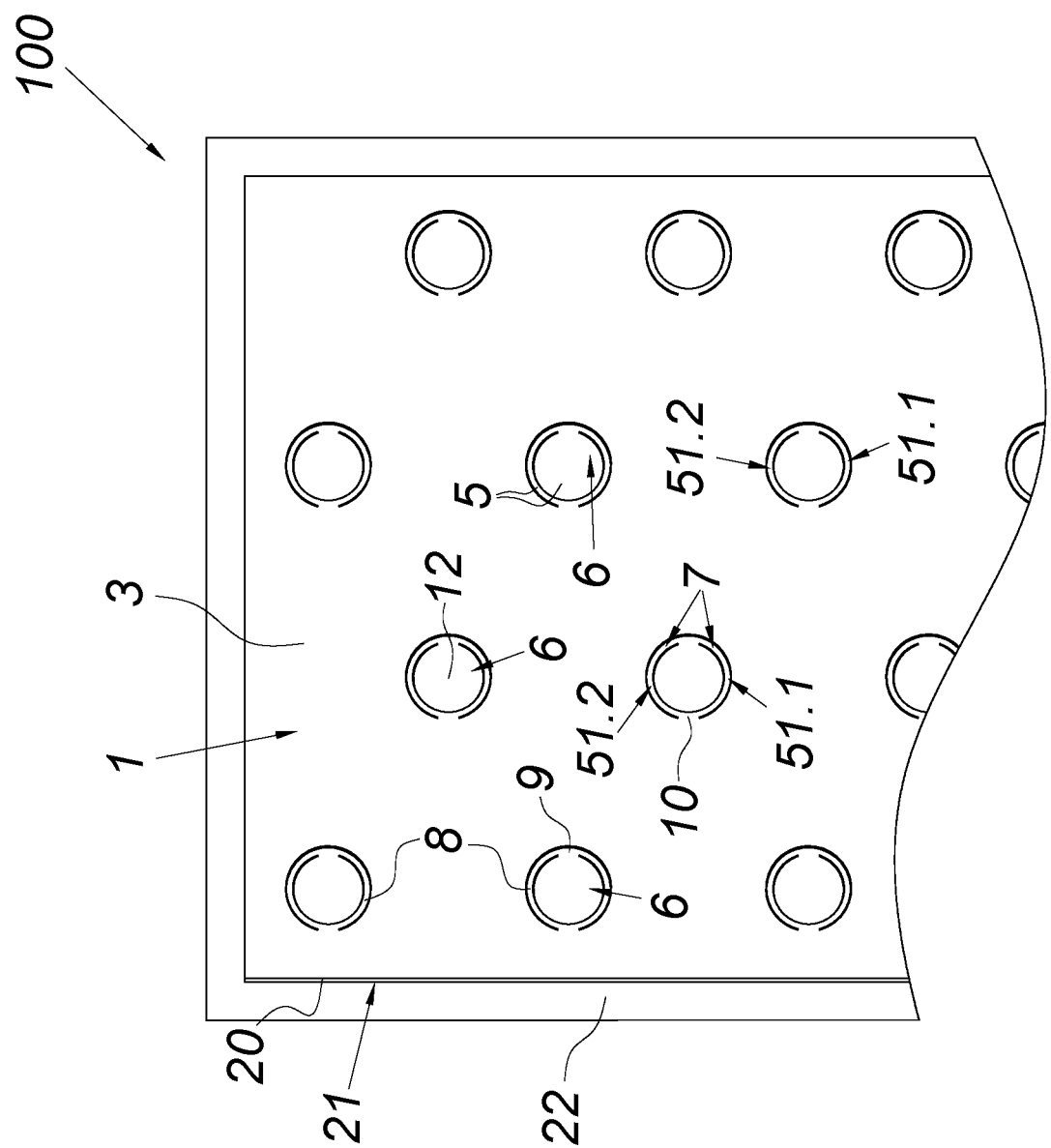
FIG. 3 shows a top view of the bus bar of a battery module.

In general, it should be noted that the sheet metal connector 5 is incised into the metal sheet 3, as a result of which the respective edges of the sheet metal connector 5 that are produced on the metal sheet 3, suspension section 7, and contact section 6 follow the respective incision line 13, as is apparent, for example, in the detailed depictions in FIGS. 2a, 2b, and 3.

The invention claimed is:

1. A bus bar for connecting battery cells, comprising:
an electrically conductive metal sheet;
at least one sheet metal connector produced in the metal sheet using a cutting method and having a contact section that is offset out from a sheet plane for electrically connecting to a pole of a battery cell;
at least one electrical fuse; and
a suspension section provided between the metal sheet and the contact section, with the suspension section being divided into at least two electrically parallel leg sections, wherein the at least one electrical fuse is composed of the at least two electrically parallel leg sections, wherein the at least one sheet metal connector, the at least one electrical fuse, and the suspension section are all formed from a single piece of the metal sheet.

2. The bus bar according to claim 1, wherein inner edges of the at least two electrically parallel leg sections extend in mirror symmetrical fashion relative to each other.

3. The bus bar according to claim 1, characterized in that the at least two electrically parallel leg sections are positioned diametrically opposite from each other.

4. The bus bar according to claim 1, wherein the at least two electrically parallel leg sections extend in the shape of a circular arc or elliptical curve.

5. The bus bar according to claim 1, wherein the at least two electrically parallel leg sections extend in the shape of a rectangle.

6. The bus bar according to claim 1, wherein the at least two electrically parallel leg sections are connected to the metal sheet and the contact section at diametrically opposed connecting pieces.

7. The bus bar according to claim 1, wherein the suspension section has a plurality of electrically serial line segments composed of the at least two electrically parallel leg sections.

8. The bus bar according to claim 1, wherein the at least two electrically parallel leg sections form a flat spring.

9. The bus bar according to claim 1, wherein the at least two electrically parallel leg sections are sheet metal strips.

10. The bus bar according to claim 1, wherein the fuse is a short circuit fuse.

11. A battery module having a plurality of battery cells and having a bus bar according to claim 1, wherein the bus bar is connected by its sheet metal connectors to one pole each of a battery cell.

12. A battery having a plurality of the battery modules according to claim 11, wherein the battery modules are electrically connected to one another.

* * * * *